United States Patent [19]

Jaeger et al.

[11] Patent Number: 5,049,884
[45] Date of Patent: Sep. 17, 1991

[54] BATTERY POWERED POLICE RADAR WARNING RECEIVER
[75] Inventors: James L. Jaeger, Cincinnati; Michael A. Biggs, Mason, both of Ohio
[73] Assignee: Cincinnati Microwave, Inc., Cincinnati, Ohio
[21] Appl. No.: 595,270
[22] Filed: Oct. 10, 1990
[51] Int. Cl.[5] .......................... G01S 7/40; H04B 17/00
[52] U.S. Cl. ..................................... 342/20; 455/228; 455/226
[58] Field of Search ................. 342/20; 455/226, 227, 455/228

[56] References Cited

U.S. PATENT DOCUMENTS

| | | |
|---|---|---|
| Re. 28,222 | 11/1974 | Wycoff ................................ 455/36 |
| 1,804,526 | 5/1931 | Coxhead ............................ 455/218 |
| 2,098,587 | 11/1937 | Markowitz ........................ 455/132 |
| 2,245,383 | 6/1941 | Brokaw et al. ..................... 455/140 |
| 2,369,230 | 2/1945 | Hansell .............................. 455/73 |
| 2,884,518 | 4/1959 | O'Neill .............................. 455/229 |
| 2,912,571 | 11/1959 | Jacobsen et al. .................. 455/212 |
| 2,912,574 | 11/1959 | Gensel ............................... 455/343 |
| 2,984,742 | 5/1961 | Worcester ......................... 455/219 |
| 3,488,596 | 1/1970 | Webster et al. ................... 455/229 |
| 3,497,813 | 2/1970 | Gallagher ......................... 455/166 |
| 3,599,100 | 8/1971 | Ward ................................. 455/217 |
| 3,611,156 | 10/1971 | Ward ............................. 455/228 X |
| 3,660,844 | 5/1972 | Potter ................................ 342/20 |
| 3,737,786 | 6/1973 | McDermott et al. ............. 455/227 |
| 3,748,584 | 7/1973 | Ribour et al. .................... 455/203 |
| 3,769,593 | 10/1973 | Williams ...................... 455/227 X |
| 3,816,768 | 6/1974 | Stein ............................ 328/258 X |
| 3,919,646 | 11/1975 | Morgan ............................. 455/158 |
| 3,937,004 | 2/1976 | Natori et al. ................. 455/130 X |
| 3,974,452 | 8/1976 | Cunningham .................... 455/158 |
| 4,181,893 | 1/1980 | Ehmke .......................... 455/343 X |
| 4,181,910 | 1/1980 | Hitterdal .......................... 342/20 |
| 4,194,153 | 3/1980 | Masaki et al. ..................... 455/31 |
| 4,246,800 | 1/1981 | Bidgood et al. .............. 330/297 X |
| 4,313,216 | 1/1982 | Jaeger et al. ..................... 455/226 |
| 4,329,657 | 5/1982 | Kamiya ............................. 330/297 |
| 4,340,973 | 7/1982 | Umetsu ............................. 455/228 |
| 4,353,065 | 10/1982 | Mori ............................. 455/228 X |
| 4,384,361 | 5/1983 | Masaki ............................. 455/31 |
| 4,411,020 | 10/1983 | Imazeki et al. .................. 455/219 |
| 4,417,246 | 11/1983 | Agnor et al. .................. 455/36 X |
| 4,419,765 | 12/1983 | Wycoff et al. .................... 455/36 |
| 4,433,307 | 2/1984 | Yokoyama ....................... 330/297 |
| 4,441,086 | 4/1984 | Karlow et al. .............. 455/297 X |
| 4,449,248 | 5/1984 | Leslie et al. ........................ 455/38 |
| 4,479,125 | 10/1984 | Mori ............................. 455/226 X |
| 4,482,867 | 11/1984 | Marchand et al. ............ 342/202 X |
| 4,506,386 | 3/1985 | Ichikawa et al. ................. 455/343 |
| 4,531,237 | 7/1985 | Bar-on et al. .................... 455/343 |
| 4,581,769 | 4/1986 | Grimsley et al. ................. 455/226 |
| 4,586,003 | 4/1986 | Gorzel et al. .................... 330/261 |
| 4,590,618 | 5/1986 | Heath et al. ..................... 455/343 |
| 4,591,914 | 5/1986 | Hakamada et al. ........... 455/343 X |
| 4,598,258 | 7/1986 | Babano ........................ 455/343 X |
| 4,631,496 | 12/1986 | Borras et al. ................. 455/76 X |
| 4,667,169 | 5/1987 | Matsuura et al. ............ 455/343 X |
| 4,673,892 | 6/1987 | Miyashita et al. ............ 455/343 X |
| 4,719,462 | 1/1988 | Hawkins ............................ 342/20 |
| 4,725,840 | 2/1988 | Orazietti ............................ 342/20 |
| 4,750,215 | 6/1988 | Biggs ................................ 455/226 |
| 4,791,420 | 12/1988 | Baba .................................. 342/20 |
| 4,862,175 | 8/1989 | Biggs et al. ........................ 342/20 |
| 4,887,086 | 12/1989 | Unser et al. ....................... 342/20 |
| 4,954,828 | 9/1990 | Orr .................................... 342/20 |

FOREIGN PATENT DOCUMENTS

| | | |
|---|---|---|
| 1591621 | 4/1969 | Fed. Rep. of Germany . |
| 522314 | 6/1975 | Japan . |
| 52-15202 | 2/1977 | Japan . |
| 52-71902 | 6/1977 | Japan . |
| 55-110436 | 8/1980 | Japan . |
| 56-154838 | 11/1981 | Japan . |
| 56-105632 | 6/1983 | Japan . |
| 59-95735 | 1/1984 | Japan . |
| 59-211332 | 11/1984 | Japan . |
| 60-190031 | 9/1985 | Japan . |
| 2136616 | 2/1983 | United Kingdom . |

OTHER PUBLICATIONS

Fuzzbuster Model RD-5 (Owner's Manual).
Maxon RD-XL (Owner's Manual).

Primary Examiner—John B. Sotomayor
Attorney, Agent, or Firm—Wood, Herron & Evans

[57] ABSTRACT

In a police radar warning receiver with a self-contained battery source of supply, battery life may be prolonged by duty cycling the RF front end circuitry of the receiver and, especially, the swept oscillator thereof at a duty cycle rate not greater than 25% with the circuitry being energized not more than once every approximately one-half second.

23 Claims, 5 Drawing Sheets

BATTERY POWERED POLICE RADAR WARNING RECEIVER

BACKGROUND OF THE INVENTION

I. Field of the Invention

The present invention is directed to an improvement in vehicle-mounted police radar warning receivers, and more particularly to such a receiver which is powered by a self-contained battery.

II. Description of the Prior Art

Police radar operates at extremely high frequencies such as in the X-band and K-band of the frequency spectrum as discussed in U.S. Pat. No. 4,313,216, assigned to Cincinnati Microwave, Inc., the assignee herein. There are, generally, two types of police radar. One emits a continuous radar signal so long as the radar unit is turned on. The other emits a brief burst of radar signal when the police officer triggers the unit. This latter type is referred to as pulsed or instant-on radar. While transmitting, both continuous and pulsed radar transmit a signal which is at a fixed frequency within the selected band.

An electronic assembly referred to as a police radar warning receiver has been devised to detect the presence of police radar signals. An example is the PASSPORT radar warning receiver manufactured by the assignee herein, Cincinnati Microwave, Inc. of Cincinnati, Ohio. The police radar warning receiver is contained in a box-like housing which may be set on the dash or clipped to the visor of a vehicle, such as a passenger car or truck, motorcycle, boat or the like, which travels on land or water in areas subject to speed-monitoring radar surveillance by police. The front panel of the receiver faces the driver and has various indicators and control knobs.

The operating electronic circuitry employed in the PASSPORT radar warning receiver to determine whether police radar signals are present is described in aforementioned U.S. Pat. No. 4,313,216 and U.S. Pat. Nos. 4,581,769 and 4,750,215, which are also assigned to the assignee hereof. As will be appreciated, the operating circuitry includes an RF front end which actually sweeps through the extremely high frequency police radar band(s) to receive and heterodyne the police radar signal to produce low frequency signals which may then be readily processed to determine whether a police radar signal wa present in the sweep and, if so, to provide audible and/or visual alarms to alert the driver to the presence of police radar.

Typical of many police radar warning receivers is that the operating circuitry is powered from the electrical system of the vehicle with which the receiver is used. To this end, extending from the rear of the housing may be a disconnectable power cord terminating in a plug which is appropriately configured to be received in the vehicle's cigarette lighter socket. The plug transmits electrical energy from the vehicle's electrical system through the cigarette lighter socket to the receiver via the power cord. However, power cords may be a nuisance to the operator of the vehicle.

Many drivers may take the radar warning receiver with them when they leave the vehicle so as to deter theft. If the operator removes the power plug with the receiver, but fails to return the cigarette lighter to the socket, or if the operator leaves the power cord behind, would-be thieves may be alerted to the possibility that a police radar warning receiver is used in that vehicle. The thief might then break into the vehicle on the mistaken belief that the receiver is still somewhere in the vehicle. Further, upon returning to the vehicle, the user must then properly reconnect the power cord or the receiver will not operate. Finally, when it is desired to carry the police radar warning receiver about, such as transferring it from vehicle to vehicle or taking it along after departing the vehicle, transportability of the receiver is hampered due to the extra bulk presented by the power cord.

In an effort to overcome some of the drawbacks associated with powering the receiver circuitry from the vehicle's electrical system, some police radar warning receivers have been offered which contain their own power supply, such as a battery contained within the receiver housing. But the operating electronic circuitry of the radar warning receiver consumes substantial amounts of energy, resulting in the need to frequently replace the battery. Efforts prior to the present invention directed to extending battery life in such battery-powered police radar warning receivers are not believed to have met with much success.

SUMMARY OF THE INVENTION

In accordance with the principles of the present invention, a battery powered police radar warning receiver is operable in a duty cycle mode such that the major power consuming circuitry of the receiver (such as all or parts of the RF front end) are intermittently energized for a brief period sufficient to interrogate a selected police radar band or bands. The circuitry is then turned off for a substantial period of time. The duty cycling mode is maintained until a possible police radar-type signal is detected during a period of interrogation. Should that occur, the receiver will be placed into a full-on mode to repetitively interrogate the band(s) for at least as long as it takes to eliminate the possible police radar signal as a false alarm or the police radar signal terminates. Because such alarm conditions usually happen only infrequently, the duty cycle mode will typically prevail thereby substantially reducing power drain on the battery and increasing batter life.

Prior to the present invention, it was believed that all of the RF front end circuitry of the police radar warning receiver must be powered up and operating whenever the receiver is in use so that a police radar signal would not be overlooked. That is, it had been thought that power consumption of the battery could not be reduced by periodically disabling major power consuming circuitry of the receiver in order to conserve battery power It had been believed that otherwise a police radar signal, especially of the instant-on type, might appear at unknown times and especially during such "off-time" in which event the police radar signal could be missed and the driver not alerted to its presence. However, it has been determined that battery life may be substantially prolonged without incurring risk of missing police radar signals if, in the duty cycle mode, the radar warning receiver examines one or more police radar signal bands of interest once every approximately one-half second and with a duty cycle of less than 25%, and preferably less than about 13%.

To this end, in the duty cycle mode, the RF front end may be energized once every approximately 525 milliseconds for less than about 68 milliseconds during which the police radar band(s) are interrogated. The result is a savings in battery power, but without substantial risk of missing a police radar signal in the form in which police radar is conventionally operated. Should a possible police radar signal be detected during a duty cycle mode interrogation, the receiver changes to a full-on mode (effectively a 100% duty cycle such that the band(s) are effectively continuously and repeatedly interrogated during the presence of such a signal. While the full-on mode places substantial drain on the battery, it will occur only at times of need, such as when police radar signals may actually be present. Thereafter, the police radar warning receiver is returned to the reduced duty cycle mode, which is effective to prolong battery life substantially without missing police radar signals.

By virtue of the foregoing there is thus provided a radar warning receiver which is powered by a self-contained battery having longer useable life than believed to have been achieved prior to the present invention.

Other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate an embodiment of the invention and, together with the general description of the invention given above, and the detailed description of the embodiment, serve to explain the principles of the present invention.

DETAILED DESCRIPTION OF THE DRAWINGS

Figure 1:
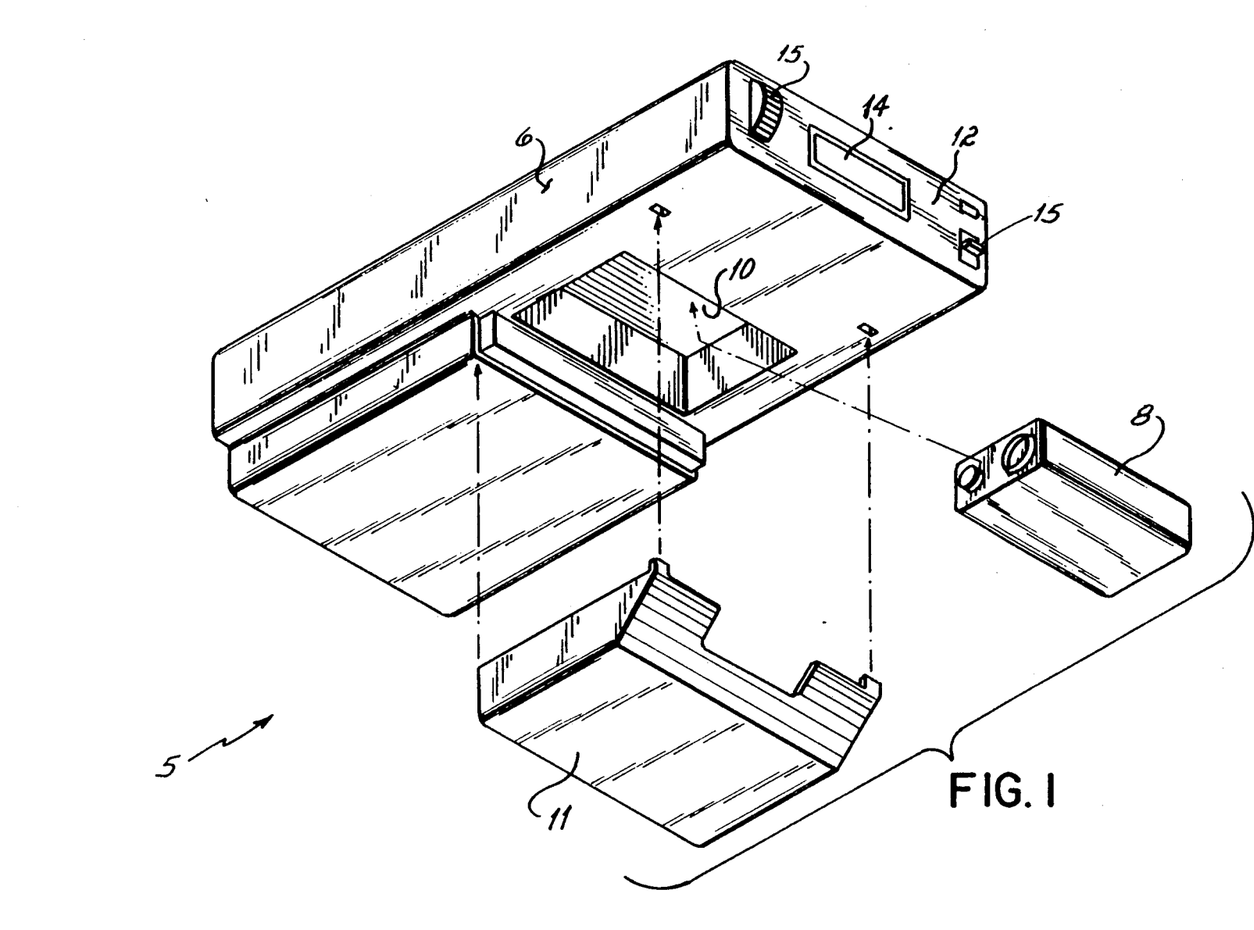
FIG. 1 is a perspective exploded view of a radar warning receiver with a self-contained battery in accordance with the principles of the present invention.

With reference to FIG. 1, there is shown a perspective exploded view of a radar warning receiver 5 according to the principles of the present invention. All of the operating circuitry (see FIGS. 2 and 3) of receiver 5 is contained within housing 6 along with a self-contained power source 8 such as a typical nine-volt transistor battery. Battery 8 is electrically connected to the operating circuitry via battery contacts (not shown) and held within compartment 10 of housing 6 by lid 11. As is well understood, receiver 5 may be supported to the windshield or visor of a car (not shown) such that the front panel 12 faces the driver (also not shown) so as to provide ready access to the visual indicators 14 and control knobs 15. Battery 8 is preferably a lithium battery, such as is available from Kodak Co. in Rochester, N.Y.

Figure 2:
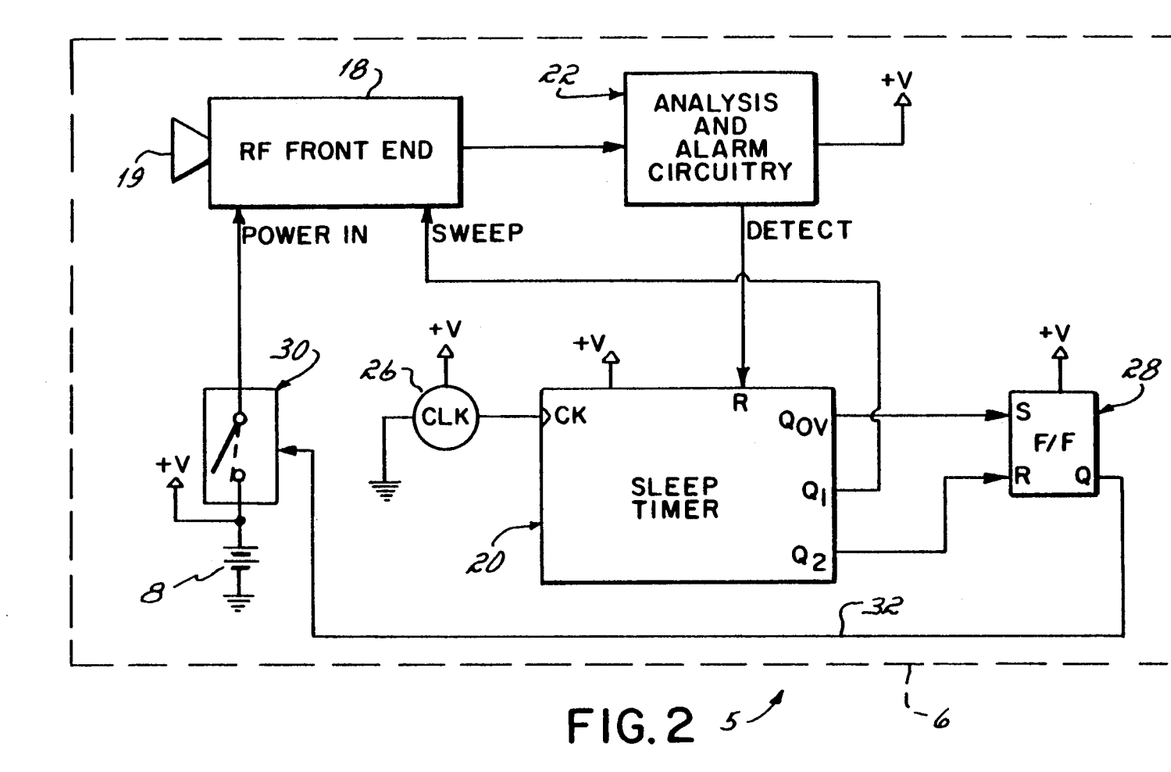
FIG. 2 is a simplified block circuit diagram of the radar warning receiver of FIG. 1.

Turning to FIG. 2, it will be seen that all of the circuitry and battery 8 are contained within housing 6 in accordance with the principles of the present invention so as to eliminate the need for a power plug. More specifically, receiver 5 includes selectively powered RF front end 18 which receives police radar signals at antenna 19. When powered on, RF front end 18 periodically receives a SWEEP signal from sleep timer 20 in response to which RF front end 18 interrogates the desired police radar band (or multiple bands as described in aforementioned U.S. Pat. No. 4,313,216, the disclosure of which is incorporated herein by reference). If any high frequency signals at antenna 19 are in the police band, i.e., if any police radar-type signals are present, RF front end 18 will output corresponding low frequency signals to analysis and alarm circuitry 22 whereat it is determined whether the received signal is a police radar signal (i.e., is from a fixed frequency source in the band) and, if so, to provide visual and audible alarms to alert the driver (not shown) to the presence of police radar.

With the exception of RF front end 18, the other circuitry of FIG. 2 is coupled to battery 8 for power whenever receiver 5 is in use (i.e., turned on). In accordance with the principles of the present invention, sleep timer 20 operates in conjunction with master clock 26 and control flip-flop 28 to selectively couple power from battery 8 to RF front end 18 via electronic switch 30. To this end, flip-flop 28 outputs on line 32 coupled to switch 30 either a high (or power-up) signal when set, or a low (or power-down) signal when reset. In response to the power-up signal, switch 30 assumes the state shown in phantom line in FIG. 2 such that battery 8 is coupled to RF front end 18 to energize same. Likewise, in response to the opposite state on line 32, i.e., a power-down signal, switch 30 assumes the state shown in solid line in FIG. 2, so as to disconnect RF front end 18 from battery 8 thereby deenergizing same and conserving battery power.

Sleep timer 20 counts in response to pulses from system clock 26 to a full count representing, for example, 525 milliseconds. At that point in time, counter 20 overflows and outputs a pulse on its overflow output (Qov) to the set input of flip-flop 28. In response, flip-flop 28 provides the power-up signal causing RF front end 18 to be energized. Sleep timer 20 continues counting such that shortly thereafter, such as approximately 5 milliseconds to allow the circuitry of RF front end 18 to settle, normally low output Q1 of timer 20 will go high to provide a SWEEP signal to RF front end 18 whereupon front end 18 will interrogate the band. As the interrogation progresses, analysis and alarm circuitry 22 will receive low frequency signals from RF front end 18 which are analyzed to determine whether a possible police radar signal is present. If, upon completion of the interrogation, no possible police radar signals are found, sleep timer 20 will be permitted to continue counting such that shortly after the end of the interrogation (anywhere from 50 to 130 ms from the power-up signal), normally low output Q2 of sleep timer will go high resetting flip-flop 28 causing RF front end 18 to be deenergized. Sleep timer 20 continues counting until the entire approximately 525 ms time is completed whereafter the above cycle is repeated to thus selectively energize RF front end once every approximately half-second and at a 10-25% duty cycle rate, depending upon the desired length of interrogation.

On the other hand, should analysis and alarm circuitry 22 detect a possible police radar signal during an interrogation, RF front end 18 is to be kept on and caused to repeatedly interrogate the appropriate police radar band. To this end, upon conclusion of the normal interrogation time, analysis and alarm circuitry 22 will provide a DETECT signal to sleep timer 20 indicating that a police radar-type signal has been detected. Responsive to the DETECT signal, sleep timer 20 will reset thereby preventing sleep timer 20 from counting to the point where flip-flop 28 is reset and RF front end 18 deenergized. Instead, sleep timer 20 will recycle through the first portion of its count thereby reinitiating an interrogation by RF front end 18 resulting in a full-on mode of receiver 5. Analysis and alarm circuitry 22 goes on to evaluate the low frequency signals from RF front end 18 to actuate audible and/or visual alarms as appropriate. The full-on mode will continue until there are one or more interrogations (up to as many as four seconds worth, for example) in which a police radar type signal was not received, at which time sleep timer 20 will be permitted to continue on in its count bringing receiver 5 back into the duty cycle mode.

In operation of the circuitry of FIG. 2, sleep timer 20 will periodically power up RF front end 18 to sweep the desired police radar band or bands, and if no police radar signal is detected in that sweep, RF front end 18 will be powered down for a substantial period of time, resulting in a duty cycle of anywhere from 10-25% such that the desired police radar band is interrogated not more than once every approximately half second (more closely approximating once every 525 ms) at the aforementioned duty cycle rate so as to substantially reduce drain on battery 8, thereby prolonging its life. Only in those circumstances where an interrogation of the police radar band results in detection of a police radar-type signal will RF front end 18 be maintained fully powered on for immediately performing subsequent interrogations until the signal is determined either to be false or the police radar signal terminates, whereafter the duty cycle mode will be reinitiated.

Figure 3:
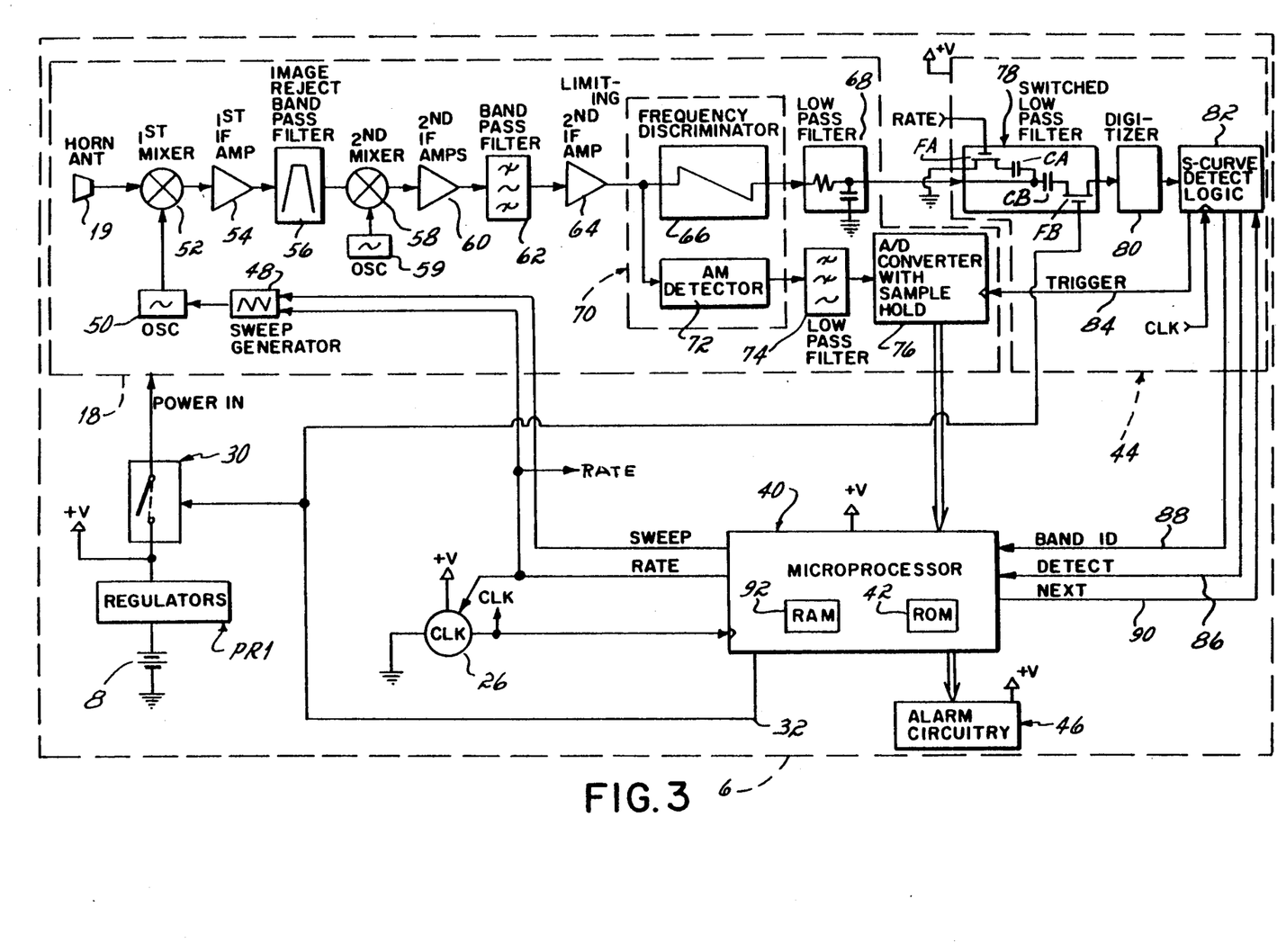
FIG. 3 is a more detailed block circuit diagram of the radar warning receiver of FIG. 1.

With reference to FIG. 3, there is shown a more detailed block circuit diagram of the operating circuitry of receiver 5. More particularly, the functionality of sleep timer 20 and latch 28 are provided by microprocessor 40 (such as a 68HC05-processor available from Motorola Semiconductors, Austin, Tex.). Microprocessor 40 operates under program control of ROM memory 42 to periodically output the power-up and power-down signals which open and close switch 30 to selectively energize RF front end 18. To this end, when receiver 5 is in use, battery 8 may drive a plurality of power regulators represented by PRI, the outputs (+v) of which are coupled directly to various parts of the operating circuitry and indirectly via one or more electronic FET switches 30 to RF front end circuitry 18. Microprocessor 40 also controls the interrogation of the police radar band(s) by RF front end 18 with SWEEP and RATE signals to be described. Further, microprocessor 40 cooperates with circuitry 44 (also to be described) to evaluate the low frequency signals produced by RF front end 18 to determine whether receiver 5 is to be in the duty cycle or full-on mode and to provide signals to alarm circuitry 46 by which to provide audible and/or visual alarms to alert to the presence of police radar.

In the duty cycle mode, microprocessor 40 outputs the power-up signal for about 67.5 ms (to allow for a 5 ms settling time and a 62.5 ms interrogation), during which the RF front end is "awake", i.e., energized, followed by the power-down signal for about 457.5 ms during which RF front end 18 is "asleep", i.e., deenergized. While RF front end 18 is awake, and after the 5 ms setting time, microprocessor 40 outputs the SWEEP signal for about 62.5 ms to cause RF front end 18 to interrogate the police radar band(s) for possible police radar type signals. In the preferred embodiment, interrogation of the police radar bands is accomplished by sweeping through the band. To this end, microprocessor 40 outputs to sweep generator 48 both the SWEEP signal and a RATE signal. In response to the SWEEP and RATE signals, sweep generator 48 causes variable frequency first local oscillator 50 to sweep in frequency from 11.48 GHz to 11.62 GHz over a period of time as indicated by the state of the RATE signal (e.g., 62.5 ms or 125 ms) so as to simultaneously sweep two police radar bands, i.e., the X-and the K-bands, as described in aforementioned U.S. Pat. No. 4,313,216. Pulsed or continuous signals occurring in the X-band or K-band and received by horn antenna 19 are mixed in first mixer 52 with first local oscillator signals from local oscillator 50 to generate first IF signals at approximately 1034 MHz. Horn antenna 19 may include filters for preventing signals at unwanted frequencies from being passed to first mixer 52, and it may further include other filters for preventing outward radiation therefrom of internally generated radio frequency signals.

The first IF signals are coupled to a pair of cascaded first IF amplifiers 54, the output of which is coupled to image reject bandpass filter 56 more fully described in U.S. Pat. No. 4,862,175, also assigned to the assignee hereof. The disclosure of U.S. Pat. No. 4,862,175 is incorporated herein by reference. The amplified and image rejected first IF signals from filter 56 are coupled to second mixer 58 to be mixed with a 1024 MHz second oscillator signal from second local oscillator 59 to produce second IF signals at approximately 10 MHz. The second IF signals are amplified by a pair of cascaded second IF amplifiers 60, the output of which is coupled through bandpass filter 62 and limiting second IF amplifier 64 to frequency discriminator circuit 66. Operation of the foregoing is generally as described in aforesaid U.S. Pat. No. 4,862,175.

FM discriminator 66 is preferably part of an FM receiver IF 70 (such as an LM3089 available from National Semiconductor Corporation, Santa Clara, Calif.; or an NE604 available from Signetics Corporation, Sunnyvale, California) and includes an AM detector 72 driven by the same IF output from amplifier 64 to produce a signal corresponding to the strength of the signal received at the frequency to which receiver 5 is tuned by oscillator 50 at that time. The signal from AM detector 72 is coupled to noise smoothing low pass filter 74 and then on to clocked analog-to-digital (A/D) converter 76 which may be part of the RF front end 18 and therefore selectively energized therewith as shown in FIG. 3, or may be separate therefrom and part of circuit 44 instead.

As the sweep of oscillator 50 progresses, RF front end 18 will output low frequency signals to microprocessor 40 and circuitry 44 for determining whether a police radar-type signal has been received at antenna 19 and, if so, whether the received signal is deemed to be a police radar signal so as to cause alarm circuitry 46 to alert to the presence of police radar. Alarm circuitry 46 may be alarm processor 65 with auto-mute as shown in the copending, recently filed U.S. patent application assigned to the assignee hereof entitled "Police Radar Warning Receiver With Auto-Mute," in the names of Lawrence Decker and Paul Allen, mailed to the U.S. Patent and Trademark Office for filing by express mail on Oct. 5, 1990. The disclosure of that recently filed application is incorporated herein by reference. The low frequency output signals from the output of FM discriminator 66 are coupled to low pass RC filter 68 and switching filter 78. Filter 78 includes a capacitor CA which may be switched in and out of the RC circuit of filter 68 by FET switch FA to affect the corner frequency of filter 68. To this end, the RATE signal is also supplied to switch FA to include capacitor CA for 125 ms sweeps of oscillator 50 and to exclude same for 62.5 ms sweeps of oscillator 50. With capacitor CA switched out, the corner frequency of filter 68 is less than 16 KHz and, preferably, less than 12 KHz. With capacitor CA switched in, the corner frequency of filter 68 is less than 8 KHz and, preferably, less than 6 KHz. The output of filter 68 is coupled in series through 0.1 microfarad blocking capacitor CB, FET switch FB and digitizer 80. Switch FB is closed (on) in response to the power-u signal for coupling the filtered signals to digitizer 80. Switch FB is switched off (or opened) with the power-down signal to retain a DC level on blocking capacitor CB, thereby reducing response time when switch FB is next enabled by the power-up signal, as will be readily understood. The evaluation signals from digitizer 80 are coupled to S-curve detect logic 82 corresponding to band discriminator circuit 28 in aforesaid U.S. Pat. No. 4,750,215, the disclosure of which is incorporated herein by reference, and already incorporated U.S. Pat. No. 4,862,175.

As the sweep of oscillator 50 progresses, S-curve detect logic 82 will output a TRIGGER signal on line 84 if there is an S-curve zero crossing resulting from sweeping into a police radar-type signal in the police radar band. If so, trigger signal 84 clocks A/D converter 76 to latch the digital word (AM word) corresponding to the strength of the received signal at that time. As the sweep proceeds further, if the full S-curve develops, then a possible police radar signal has been received. As a consequence, S-curve detect logic 82 will output a DETECT signal on line 86 to indicate same. A BAND ID signal is output on line 88, the state of which indicates the band (X- or K-) of the received signal. In response to DETECT signal 86, microprocessor 40 will note the location in the sweep of the DETECT signal, and will examine the latched, digitized AM word output of A/D converter 76 indicative of the strength of the signal at that point in the sweep. The location and the band (BAND ID), along with the AM word from converter 76, will be stored in RAM memory 92 for subsequent manipulation by microprocessor 40. If any prior DETECT signals have been stored in that sweep, microprocessor 40 may also do on-the-fly image reject processing, such that if the AM word from A/D converter 76 indicates that the newly detected signal thereat is approximately 15 db or more weaker than the strongest signal received during that sweep to that time, the information for that particular signal will not be stored in RAM 92 but will instead be rejected. Also, so as not to overload the memory capacity of RAM 92, the information from no more than eight possible detects during a single sweep of oscillator 50 are typically preserved. To this end, once the information for eight such detects is stored in RAM 92, information for any subsequent detects in that sweep will be stored only if the magnitude of the related AM word from A/D converter 76 is stronger than the magnitude of the weakest stored signal, in which event the information for the weakest stored signal will be replaced by information from the newest detected signal. Once the DETECT signal is acted upon by microprocessor 40, a NEXT signal is coupled to S-curve detect logic 82 on line 90 for purposes to be described hereinafter.

Receiver 5 is normally operating in the duty cycle mode such that microprocessor 40 will periodically provide a power-up signal to switch 30 which power-up signal will be maintained for about 67.5 ms to allow for one sweep of oscillator 50, including 5 ms of settling time for the selectively powered-up circuitry and 62.5 ms of actual sweep time for oscillator 50. To this end, the SWEEP and 62.5 ms RATE signals will be provided after the first 5 ms, to cause oscillator 50 to sweep. At the end of the sweep, SWEEP signal is terminated to stop oscillator 50 from sweeping. Also, if no detect signals 86 were produced during the sweep, the power-up signal is replaced with a power-down signal and switch 30 opened (solid line position in FIG. 3) so as to power-down RF front end 18. On the other hand, if a detect signal 86 had been produced, microprocessor 40 would place receiver 5 into the full-on mode. In the full-on mode, the SWEEP signal would be terminated at the end of each sweep, but only briefly (such as 10 ms) to allow post-processing within microprocessor 40. In the meantime, the power-up signal would be maintained to keep RF front end 18 energized. After the brief processing period, the SWEEP signal would be provided along with an appropriate RATE signal to provide a 125 ms sweep of oscillator 50 for improved variable frequency signal rejection and decreased response time. The full-on mode is maintained with alternating 125 ms sweeps and 10 ms processing intervals until no more DETECT signals 86 are produced by S-curve detect logic 82, after which (preferably after four seconds of sweeps with no DETECT signals 86 being produced) the duty cycle mode is restored. In both modes, system clock 26 is responsive to the RATE signal so as to provide one clock rate (such as 66 KHz) for 125 ms sweeps of oscillator 50 and a second, higher clock rate (such as 132 KHz) for 62.5 ms sweeps.

Figure 4:
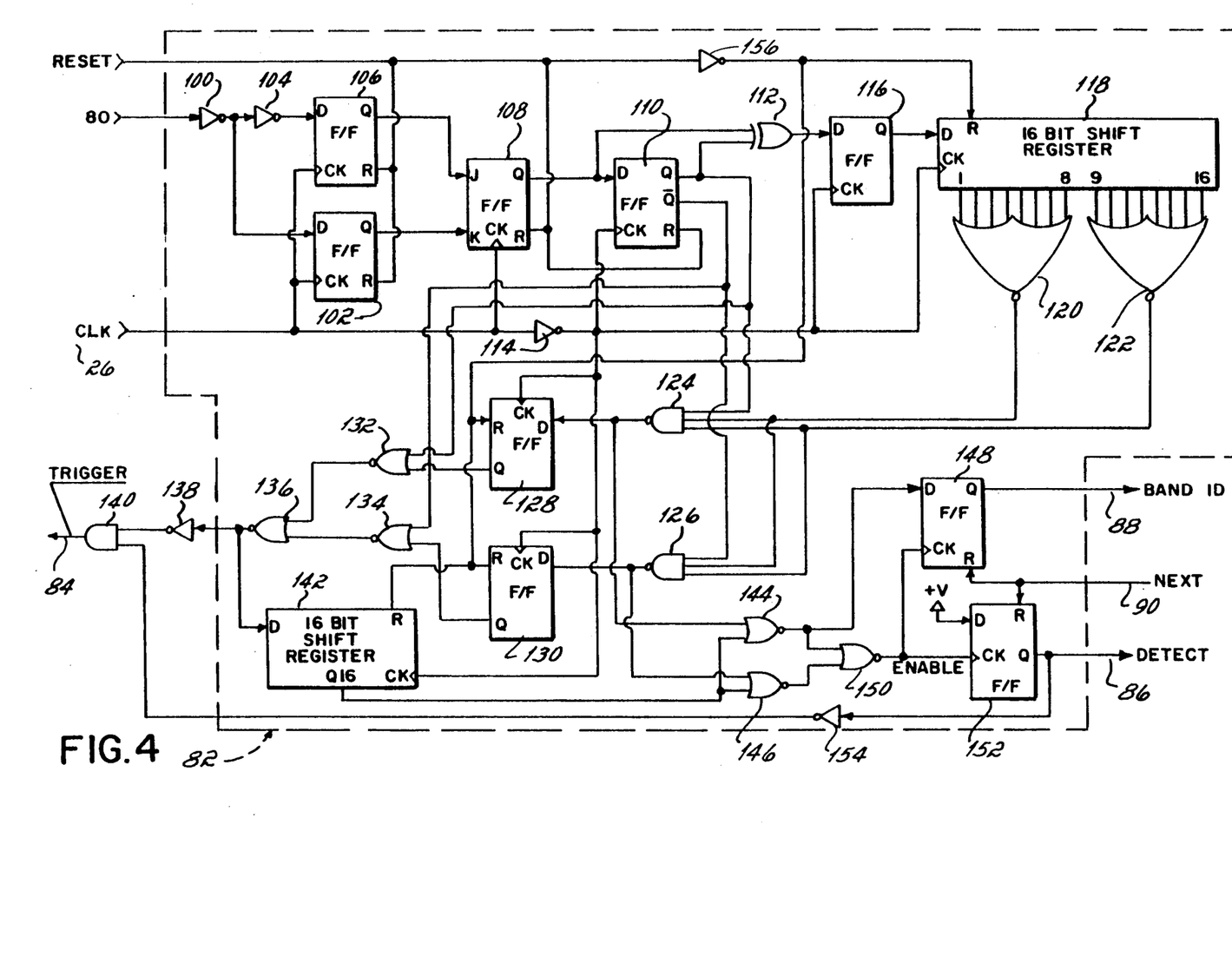
FIG. 4 is a schematic diagram of the S-curve detect logic of FIG. 3.

Turning now to FIG. 4, there is shown a circuit schematic of S-curve detect logic 82. The output of digitizer 80 is coupled (i) through a first inverter 100 to a first D-type flip-flop or latch 102, and (ii) through inverter 100 and second inverter 104 to second D-type flip-flop or latch 106. Thus, the output of inverter 100 will be at a logic level opposite that of the output of digitizer 80, while the output of inverter 104 will be at the same logic level as the digitizer output but slightly delayed. Thus, when system clock 26 pulses flip-flops 102, 106, they will contain data indicating whether the digitizer output was a one or a zero, or a transition between those two opposite states.

The Q output of latch 106 is coupled to the J input of a J-K-type flip-flop 108, while the Q output of latch 102 is coupled to the K input of flip-flop 108 to pass on the data from flip-flops 102, 106 if in opposite states or to toggle if their data represents a transition. The Q output of flip-flop 108 is in turn coupled to the D input of D-type flip-flop 110, with the input and output thereof coupled to respective inputs of exclusive OR gate 112 to provide an output indicative of whether the S-curve from FM discriminator 66 is being detected by clocking flip-flop 110 with a clock pulse delayed by inverter 114. The output of exclusive OR gate 112 is coupled to the D input of flip-flop 116 to resolve a timing conflict and thence on to the input of 16-bit shift register 118 to store data indicating whether streams of continuous ones or zeros are being detected, or whether the output of FM discriminator 66 is fluctuating.

As the sweep of oscillator 50 progresses, noise from FM discriminator 66 will cause the digitized output from digitizer 80 to be randomly changing between logical ones and zeros but in the presence of an in-band signal at antenna 19, will cause generation of the characteristic S-curve such that the output of digitizer 80 will be in one state for several pulses of system clock 26 and then in a second, opposite state for a second series of such pulses, but with a transition therebetween.

As the data is shifted into shift register 118, the outputs thereof may be examined to indicate whether an S-curve zero crossing has been encountered (a string of at least 16 ones or zeros followed by a transition). To this end, the first eight data outputs from shift register 118 are coupled to NOR gate 120, whereas the second eight data output bits from shift register 118 are coupled to NOR gate 122 so as to provide from the output of NOR gates 120 and 122 a logic one only when all of the associated data outputs from shift register 118 are also at a logic on level indicating that there were no transitions or S-curve zero crossings during the portion of the sweep of oscillator 50 associated with those sixteen data bits.

The outputs of NOR gates 120 and 122 are coupled to two of the three inputs of NAND gates 124 and 126. The remaining input to each of NAND gates 124, 126 is coupled to the Q and $\overline{Q}$ outputs of flip-flop 110, respectively, so as to provide on their respective outputs an indication of whether the string of incoming data was either all ones or all zeros. The outputs of NAND gates 124 and 126 are coupled to the D inputs of respective D-type flip-flops 128 and 130 which are clocked through inverter 114 so as to provide on their Q outputs signals indicative of the state of NOR gates 124 and 126. The Q outputs of flip-flops 128 and 130 are coupled to the inputs of respective NOR gates 132 and 134, the other inputs of which are coupled to the Q and $\overline{Q}$ outputs of latch 110, respectively. The outputs of NOR gates 132 and 134 drive NOR gate 136 which outputs through inverter 138 a pulse if a string of zeros or ones from digitizer 80 are followed by a transition indicative of an S-curve zero crossing so as to clock A/D converter 76 with a TRIGGER pulse if AND gate 140 is enabled.

The output of NOR gate 136 is also coupled to the data input of a second 16-bit shift register 142, also clocked through inverter 114. The 16th bit output (Q16) of register 142 is coupled to one input of each of NOR gates 144 and 146. The other input of NOR gate 144 is coupled to the output of NAND gate 124, whereas the input of NOR gate 146 is coupled to the output of NAND other gate 126.

Due to second 16-bit shift register 142, NOR gates 144 and 146 will provide outputs if the S-curve after the transition is completed by a second set of all zeros or ones from digitizer 80 of a state opposite that of the data bits from digitizer 80 preceding the transition (indicated by the TRIGGER pulse to AND gate 140). The output of NOR gate 144 is coupled to the D input of D-type flip-flop 148 which is clocked in response to an enable signal from NOR gate 150, which is driven by the output of both NOR gates 144 and 146. In response to the enable signal from NOR gate 150, flip-flop 148 will be clocked to provide on its output the BAND ID signal 88 having one of two polarities associated with the X- and the K-bands, respectively. Similarly, the enable pulse from NOR gate 150 will clock D-type flip-flop 152 to provide a logical high output which is the DETECT signal 86 to microprocessor 40. The DETECT signal is also coupled through inverter 154 to AND gate 140 thereby disabling same so that subsequent TRIGGER pulses from NOR gate 136 will not be passed on to A/D converter 76 to clock same until AND gate 140 is again enabled by resetting of flip-flop 152. To this end, upon receiving the NEXT signal from microprocessor 40, flip-flops 148 and 152 are reset so that the BAND ID signal can be set to the appropriate polarity upon receipt of the next full S-curve signal and the DETECT signal may once again be provided with an intervening S-curve zero crossing, resulting in a TRIGGER pulse being coupled through AND gate 140 to A/D converter 76.

On power-up of microprocessor 40 when receiver 5 is first turned on, a power-on reset signal may be provided to various parts of the operating circuitry of receiver 5 to initialize matters. To this end, the power-on reset signal is coupled directly to flip-flops 102, 106, 108 and 110, and through inverter 156 to shift registers 118 and 120, and flip-flops 128 and 130 to reset same.

Figure 5:
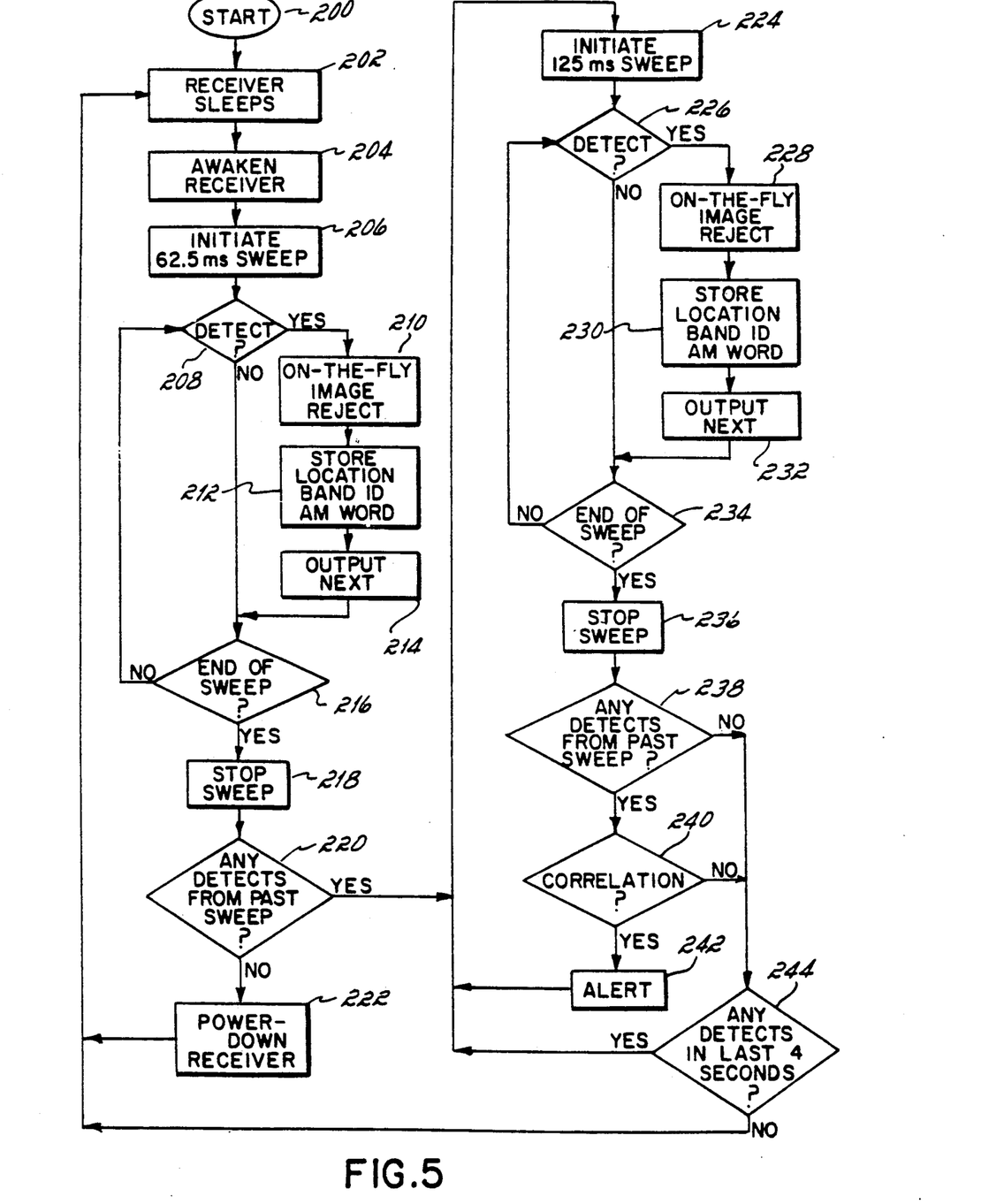
FIG. 5 is a flow chart of operation of the microprocessor of FIG. 3 for purposes of explaining the principles of the present invention.

Programmed controlled operation of microprocessor 40 will now be described with reference to the flow chart of FIG. 5. Normally, microprocessor 40 causes receiver 5 to operate in the duty cycle mode. To this end, normal operation starts at step 200 and proceeds to step 202 whereat receiver 5 "sleeps" for 447.5 milliseconds, i.e., the power-down signal is output to switch(es) 30 for that duration to deenergize RF front end 18. Microprocessor 40 may utilize a timer for this purpose and may also accomplish other housekeeping tasks such as monitoring the various control knobs 15, to turn receiver 5 on and off, or for other matters such as the security key feature disclosed in copending application Ser. No. 07/421,549, filed Oct. 13, 1989, assigned to the assignee hereof and the disclosure of which is incorporated herein by reference. Microprocessor 40 may also undertake other housekeeping tasks unrelated to the present invention.

After the sleep timer has timed-out, at step 204 microprocessor 40 will output the power-up signal on line 32 to switch(es) 30 to energize RF front end 18. Five milliseconds later, at step 206, a 62.5 ms sweep of oscillator 50 will be caused by outputting a SWEEP signal and an appropriate RATE signal to a sweep generator 48. For the duration of the sweep, data is collected related to received signals. To this end, if during a sweep a DETECT signal is generated, microprocessor 40 will note same at step 208 and will proceed to step 210 to obtain the AM word and do on-the-fly image rejection of weak signals as previously described. If not rejected, at step 212 the location in the sweep of the DETECT signal, along with the associated BAND ID and AM word, will be stored. This information thus provides an approximate position in the sweep of a received police radar-type signal corresponding to its actual frequency, along with its amplitude and band. Thereafter, at step 214 microprocessor 40 will output NEXT signal 90 to clear S-curve detect logic 82 for subsequent TRIGGER and DETECT signals.

If no DETECT occurs at step 208, or NEXT 90 is generated at step 214, step 216 is undertaken whereat it is determined if the end of the sweep has been reached (the sweep time has elapsed). If no, the sequence returns to step 208 to look for another DETECT. Although shown as a loop, the sequence of steps 208, 210, 212, 214 and 216 could be based upon an interrupt system as will be readily appreciated by those skilled in the art.

If, at step 216, the end of the sweep has occurred, the sequence proceeds to step 218 whereat the SWEEP signal is terminated so as to stop the sweep of oscillator 50. Then, at step 220, it is determined whether any DETECTS were received during the immediately prior sweep. If not, the sequence proceeds to step 222 to replace the power-up signal with a power-down signal to open switch(es) 30, thereby powering-down RF front end 18 whereupon sleep step 202 is undertaken. It will be appreciated that the entire sequence from step 202 to step 220 will take approximately 525 milliseconds. If any of the intermediate processing steps occurs so quickly as to reduce that time, then the sleep period at step 202 may simply be extended by an equivalent amount.

If, at step 220, it is determined that a DETECT signal had been produced during the just-finished sweep of oscillator 50, receiver 5 will be placed in the full-on mode whereat the sequence will proceed to step 224 with the power-on signal maintained. At step 224, the SWEEP signal is reinitiated, along with a new RATE signal to cause oscillator 50 to sweep at a 125 millisecond sweep rate. The sequence then proceeds to steps 226, 228, 230, 232, 234, 236 and/or 238 which are duplicatives of steps 208, 210, 212, 214, 216, 218 and/or 220, respectively. If at the end of the 125 ms sweep it is determined at step 238 that any DETECTS 86 were produced during the immediately prior sweep of oscillator 50, then the sequence will proceed to step 240 whereat location information of the stored data for that sweep will be compared with the location information stored from the next prior sweep to see if there is any correlation therebetween. This sweep-to-sweep type of correlation is shown in U.S. Pat. No. 4,581,769, assigned to the assignee hereof and the disclosure of which is incorporated herein by reference. To this end, should a DETECT signal 86 have been produced at approximately the same location in two successive sweeps, the result at step 240 will be affirmative, in which event, microprocessor 40 will proceed to step 242 to output to alarm circuitry 46 signals appropriate to cause alarm circuitry 46 to generate audible and/or visual alarms to alert the driver (not shown) to the presence of police radar. The sequence will then return to step 224 to repeat the 125 ms sweep thus repeating the full-on cycle.

If, on the other hand, it was determined at step 238 that there were no DETECTS through the sweep, or at stop 240 that there was no correlation, the process branches to step 244 whereat it is determined whether there has been any DETECT signal 86 in the last four seconds. If no, receiver 5 is placed back into the reduced power duty cycle mode (with the oscillator swept at a duty cycle of about 12.9%) by branching the sequence to step 202 to initiate the sleep mode. If yes, the full-on mode is to be maintained so the sequence branches back to step 224 such that the oscillator is swept at a significantly higher duty cycle rate.

At step 212 or 230, further processing may occur. To this end, the band and location of the received signal may be compared to all of the existing signals already in memory 92 of microprocessor 40. If it is determined that the signal causing the present DETECT 86 is already in the memory, then the information for that received signal is updated with the new AM word from A/D converter 76 and new location information in the event DETECT 86 does not occur at precisely the same time in the sweep as it did in the prior sweep. To this end, the determination as to whether or not a detected signal is another occurrence of an existing signal in memory 92 is made based upon the band being the same and the location within the band being within ±1 ms of the value in memory. This tolerance in the location value accounts for resolutions, sweep repeatability, and short term drifts of receiver 5 and the police radar transmitter (not shown).

By virtue of the foregoing, there is thus provided a radar warning receiver which is powered by a self-contained battery having longer useable life than believed to have been achieved prior to the present invention. Thus, one or more police bands will be interrogated not more than once every about onehalf second, with the RF front end 18 energized at not more than a 25% duty cycle and preferably less than about a 13% duty cycle to thereby detect police radar signals as necessary but without normally requiring full-on energization of RF front end 18 and related power drain of battery 8 when no police radar-type signals are present. Even lower duty cycles could be obtained if circuitry 42 and microprocessor 40 are replaced by the DSP and related circuitry as shown in U.S. Pat. No. 4,954,828, also assigned to the assignee hereof and the disclosure of which is incorporated herein by reference. Additional advantages and modifications will readily appear to those skilled in the art. For example, receiver 5 could be adapted to monitor an additional police radar band, such as by first simultaneously sweeping the basic bands (X and/or K) and then immediately thereafter sweeping the added band before turning the RF front end off in the duty cycle mode. Also, in the full on mode, alternating sweeps of the combined X- and K-bands and the third band could be undertaken. Additionally, one of the most power consuming parts of the RF front end is oscillator 50. Thus, some battery life enhancement in accordance with the principles of the present invention may be obtained merely by duty cycling oscillator 50, while leaving the rest of RF front end 18 fully powered on. The present invention in its broader aspects is therefore not limited to the embodiments and illustrated examples shown and described. Accordingly, departures may be made from such details without departing from the spirit or scope of the present invention.

Of course, to reduce power consumption when in use, it is desirable to use low voltage power supplies and low powered circuitry. To this end, regulators PRI provide ±3.0 volt and ±3.5 volt supplies for much of the operating circuitry, although −8 volt is provided for use in controlling oscillator 50. Also, the digital circuitry is preferably CMOS or the like and oscillator 50 is preferably an FET oscillator.

Having described the invention, we claim:

1. A police radar warning receiver comprising:
   a housing containing operating circuitry and a compartment for holding a battery within the housing for powering the operating circuitry, the operating circuitry including:
   energizable RF front end circuit means for interrogating at least one police radar band and outputting low frequency signals in response to signals in the band;
   switch means having first and second states for coupling said RF front end circuit means to the battery in said first state and de-coupling same in said second state whereby to selectively energize and de-energize said RF front end circuit means; and
   duty cycle means for causing said switch means to be in said first state not more often than once every about one-half second and after a period of time to switch to said second state, said period of time defining a duty cycle rate not greater than about 25%.

2. The police radar warning receiver of claim 1 further comprising means for defining said period of time sufficient for said RF front end circuit means to interrogate the band.

3. The police radar warning receiver of claim 1 further comprising means for causing said period of time to define a duty cycle rate of not more than about 13%.

4. The police radar warning receiver of claim 1 further comprising:
analysis circuit means responsive to said low frequency signals for detecting presence of police radar-type signals in the band.

5. The police radar warning receiver of claim 4 further comprising:
full-on means responsive to said analysis circuit means for overriding said duty cycle means and causing said switch means to be in said first state substantially beyond said period of time so as to define a second, significantly higher duty rate.

6. The police radar warning receiver of claim 1 further comprising:
full-on means active upon detection of a police radar-type signal for overriding said duty cycle means and causing said switch means to be in said first state substantially beyond said period o time so as to define a second, significantly higher duty rate.

7. A police radar warning receiver comprising:
a housing containing operating circuitry and a compartment for holding the battery within the housing for powering the operating circuitry, the operating circuitry including:
oscillator means for generating an oscillator signal which is swept in frequency between a first frequency and a second frequency associated with at least one police radar band;
mixer means for mixing the oscillator signal with received signals to provide IF signals;
circuit means responsive to the IF signals for detecting that a police radar-type signal has been received during a given sweep of the oscillator means;
switch means having first and second states for coupling at least said oscillator means to the battery in said first state and de-coupling same in said second state whereby to selectively energize and de-energize at least said oscillator means; and
duty cycle means for causing said switch means to be in said first state not more often than once about every one-half second and after a period of time to switch to said second state, said period of time defining a duty cycle rate not greater than about 25%.

8. The police radar warning receiver of claim 7 further comprising means for defining said period of time sufficient for said oscillator means to make only one sweep between said first and second frequencies.

9. A police radar warning receiver comprising:
a housing containing operating circuitry and a compartment for holding a battery within the housing for powering the operating circuitry, the operating circuitry including:
oscillator means for generating an oscillator signal which is swept in frequency between a first frequency and a second frequency whereby to interrogate at least one police radar band;
mixer means for mixing the oscillator signal with received signals in the band to produce IF signals related thereto;
FM receiver means responsive to the IF signals for outputting low frequency signals in response to signals in the band;
switch means having first and second states for coupling at least said oscillator means to the battery in said first state and de-coupling same in said second state whereby to selectively energize and de-energize at least said oscillator means;
duty cycle means for causing said switch means to be in said first state not more often than once about ever one-half second and after a period of time to switch to said second state, said period of time defining a duty cycle rate not greater than about 25%; and
control means for causing said oscillator means to make one sweep between said first and second frequencies during said period of time.

10. The police radar warning receiver of claim 9 further comprising means for defining said period of time approximately equal to the time for said oscillator means to make said one sweep.

11. The police radar warning receiver of claim 9 further comprising:
full-on means active upon detection of a police radar-type signal for overriding said duty cycle means and causing said switch means to be in said first state for at least as long as a police radar-type signal is present.

12. The police radar warning receiver of claim 11, said full-on means further for overriding said control means to cause said oscillator means to make repeated sweeps during said about one-half second.

13. The police radar warning receiver of claim 9 further comprising:
analysis circuit means responsive to the low frequency signals output by the FM receiver means for detecting presence of police radar-type signals in the band.

14. The police radar warning receiver of claim 13 further comprising:
full-on means responsive to said analysis circuit means for overriding said duty cycle means and causing said switch means to be in said first state substantially beyond said period of time so as to define a second, significantly higher duty rate.

15. The police radar warning receiver of claim 9 further comprising means for causing said period of time to define a duty cycle rate of not more than about 13%.

16. The police radar warning receiver of claim 9, said switch means further for coupling and decoupling said mixer means to the battery in said first and second states, respectively.

17. The police radar warning receiver of claim 9, said switch means further for coupling and decoupling said FM receiver means to the battery in said first and second states, respectively.

18. A method of operating a police radar warning receiver powered by a self-contained battery comprising:
operating in a duty-cycle mode including repeatedly:
energizing the RF front end circuitry of the receiver every about one-half second and for a period of time substantially less than one-half second;

interrogating at least one police radar band while the RF front end circuitry is energized; and de-energizing the RF front end circuitry after the period of time; and operating in a full-on mode if a police radar-type signal is detected during an interrogation including:

energizing the RF front end circuitry; and repeatedly interrogating a police radar band.

19. The method of claim 18 further comprising returning to operation in the duty cycle mode after the full-on mode.

20. The method of claim 18 further comprising returning to operation in the duty cycle mode after no police radar-type signals are detected in the full-on mode.

21. A method of operating a police radar warning receiver powered by a self-contained battery comprising:

operating in a duty-cycle mode including repeatedly:

energizing a swept oscillator circuit every about one-half second and for a period of time substantially less than one-half second;

while the swept oscillator circuit is energized, generating an oscillator signal which is swept in frequency between a first frequency and a second frequency whereby to interrogate at least one police radar band;

mixing the oscillator signal with received signals in the band to produce IF signals related thereto;

responsive to the IF signals, outputting low frequency signals in response to signals in the band; and de-energizing the swept oscillator circuit; and operating in a full-on mode if a police radar-type signal is detected during an interrogation including:

energizing the swept oscillator circuit; and repeatedly generating the oscillator signal.

22. The method of claim 21 further comprising returning to operation in the duty cycle mode after the full-on mode.

23. The method of claim 21 further comprising returning to operation in the duty cycle mode after no police radar-type signals are detected in the full-on mode.

* * * * *

UNITED STATES PATENT AND TRADEMARK OFFICE
CERTIFICATE OF CORRECTION

PATENT NO. : 5,049,884
DATED : September 17, 1991
INVENTOR(S) : James L. Jaeger and Michael A. Biggs It is certified that error appears in the above-identified patent and that said Letters Patent is hereby corrected as shown below:

Col. 7, Line 14, "u" should be --up--

Col. 9, Line 18, "on" should be --one--

Col. 12, Line 45, "PRI" should be --PR1--

Col. 13, Line 29, "o" should be --of--

Signed and Sealed this

Twenty-fifth Day of May, 1993

Attest:

MICHAEL K. KIRK

Attesting Officer

Acting Commissioner of Patents and Trademarks